(12) United States Patent
Alemany et al.

(10) Patent No.: US 7,894,823 B2
(45) Date of Patent: Feb. 22, 2011

(54) SYSTEM FOR ENHANCED CAPACITY AND QUALITY OVER WLAN

(75) Inventors: Juan Alemany, Sunnyvale, CA (US); Thane Frivold, Redwood City, CA (US); Andy Kelm, San Carlos, CA (US); Darren Lancaster, Campbell, CA (US)

(73) Assignee: Nokia Inc., Irving, TX (US)

( * ) Notice: Subject to any disclaimer, the term of this patent is extended or adjusted under 35 U.S.C. 154(b) by 1045 days.

(21) Appl. No.: 10/862,774

(22) Filed: Jun. 7, 2004

(65) Prior Publication Data

US 2005/0271021 A1 Dec. 8, 2005

(51) Int. Cl.
H04W 72/00 (2009.01)

(52) U.S. Cl. .................................. 455/453; 455/452.2

(58) Field of Classification Search .................. 455/436, 455/439, 442, 33.2, 435.1, 456.1, 453; 370/331
See application file for complete search history.

(56) References Cited

U.S. PATENT DOCUMENTS

| | | | |
|---|---|---|---|
| 5,896,373 A | | 4/1999 | Mitts et al. |
| 6,119,005 A * | | 9/2000 | Smolik ........................ 455/436 |
| 6,360,264 B1 | | 3/2002 | Rom |
| 7,158,484 B1 * | | 1/2007 | Ahmed et al. ................ 370/254 |
| 7,206,598 B2 * | | 4/2007 | Attar et al. ................... 455/522 |
| 7,356,305 B2 * | | 4/2008 | Peeters ....................... 455/12.1 |
| 2002/0187749 A1 * | | 12/2002 | Beasley et al. ................ 455/41 |
| 2003/0017838 A1 * | | 1/2003 | Kayama et al. .............. 455/525 |
| 2004/0005878 A1 | | 1/2004 | Olin et al. |
| 2004/0097234 A1 * | | 5/2004 | Rajkotia et al. .............. 455/442 |
| 2004/0266474 A1 * | | 12/2004 | Petrus ......................... 455/525 |
| 2005/0048974 A1 * | | 3/2005 | Kim et al. .................... 455/436 |

OTHER PUBLICATIONS

Notification of Transmittal of the International Search Report and the Written Opinion of the International Searching Authority, or the Declaration, pp. 1-13, dated Apr. 20, 2006.
Office Action for Korean Application No.10-2008-7029426 dated Jul. 21, 2010.

* cited by examiner

*Primary Examiner*—Tu X Nguyen
(74) *Attorney, Agent, or Firm*—Alston & Bird LLP (57) ABSTRACT

A method and system for controlling wireless communication between a mobile terminal and a plurality of wireless access points. Link status and quality data is determined about each communication link between the mobile terminal and each wireless access point that is currently detectable by the mobile terminal. A priority list of the detected wireless access points is also generated. Also determined are access point status and quality data about the wireless access points themselves and/or a network connecting them. This access point data may not be accessible to the mobile terminal. The access point data can also include status and/or quality of neighboring wireless access points that are near the detected wireless access points, but not yet detected by the mobile terminal. The link data, access point data and another ranking are used to select a best wireless access point with which the mobile terminal will communicate.

36 Claims, 4 Drawing Sheets

SYSTEM FOR ENHANCED CAPACITY AND QUALITY OVER WLAN

FIELD OF THE INVENTION

The present invention is directed to controlling communication between a mobile terminal and one or more wireless access points, and more specifically to enabling a mobile device to select a wireless access point based on current status data regarding a network of available wireless access points and communication links to available wireless access points.

BACKGROUND OF THE INVENTION

The popularity and prevalence of wireless local area network (WLAN) deployments has increased dramatically in recent years. Contributing to this increase are communication standards such as the Institute of Electrical and Electronic Engineers (IEEE) 802.11 suite of standards, which define physical operating parameters, packet formats, and protocol behaviors for the exchange of data between mobile terminals and wireless access points. These standards also typically define the interactions between mobile terminals and access points to coordinate a handoff from one wireless access point to another. However, the standards do not necessarily dictate how handoff decisions are made. Typically, mobile stations assess a locally measured radio signal strength of beacons sent by nearby access points to select the access point with the strongest signal and highest available data rate. For most practical purposes, this metric boils down to choosing the physically closest access point. However, for a variety of network reasons, the closest access point is not necessarily always the best access point.

For example, offering high quality, reliable voice communication through access points of a WLAN service is challenging. Voice applications typically send small data packets (e.g. 40-60 bytes), yet send the data packets very frequently (e.g. every 20 milliseconds). Consequently, voice applications are sensitive to network latency, reliability, and capacity. Packets of voice data that do not arrive quickly, or "on time" relative to other voice data, are of little or no value to a listener. Delay, loss, and reordering of packets typically translates into "clicks", "pops", and general poor voice quality for the listener. Also, since voice data packets are small, a relatively high percentage of overhead data and processing is needed to identify and route voice data packets. In addition, since WLAN standards typically support a variety of data rates, the overall capacity of access points usually varies greatly with the number and location of mobile terminals, as well as the type of traffic being sent. Further, since WLAN connections typically use unlicensed radio frequency (RF) spectrum, transmitters can rightfully contend for the shared airways. The competition for air time can increase latency due to collision detection, retransmissions, and decreased data rates (hence increased propagation time and RF resource usage). All of these network performance factors contribute to the quality of a voice call or other communication using WLAN. However, a mobile terminal typically selects an access point based on locally available information such as radio signal strength, biasing mobile terminals to select the "closest" access point, which may not be the access point that will provide the best quality voice call or other communication.

DETAILED DESCRIPTION OF THE INVENTION

Various embodiments of the present invention will be described in detail with reference to the drawings, where like reference numerals represent like parts, assemblies, and/or operations throughout the several views. Reference to various embodiments does not limit the scope of the invention, which is limited only by the scope of the claims attached hereto. Additionally, any examples set forth in this specification are not intended to be limiting, and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The phrases "in one embodiment" and "an exemplary embodiment," as used herein do not necessarily refer to the same embodiment, although they may. The term "connected" means a direct electrical connection between the items connected, without any intermediate devices. The term "coupled" means either a direct electrical connection between the items connected, or an indirect connection through one or more passive or active intermediary devices or mediums. The terms "communicate" and "in communication with" mean that elements can be connected, coupled, and/or functionally exchange information, including wirelessly through a medium such as the air. The term "interface" means a single component, a multiplicity of components, a single software module, a multiplicity of software modules, and/or a combination of the preceding either active and/or passive, that are in communication to provide a desired action. The term "signal" means at least one current, voltage, charge, temperature, data, or other detectable element. The term "operation" means one or more actions, steps, procedures, and/or functions.

Figure 1:
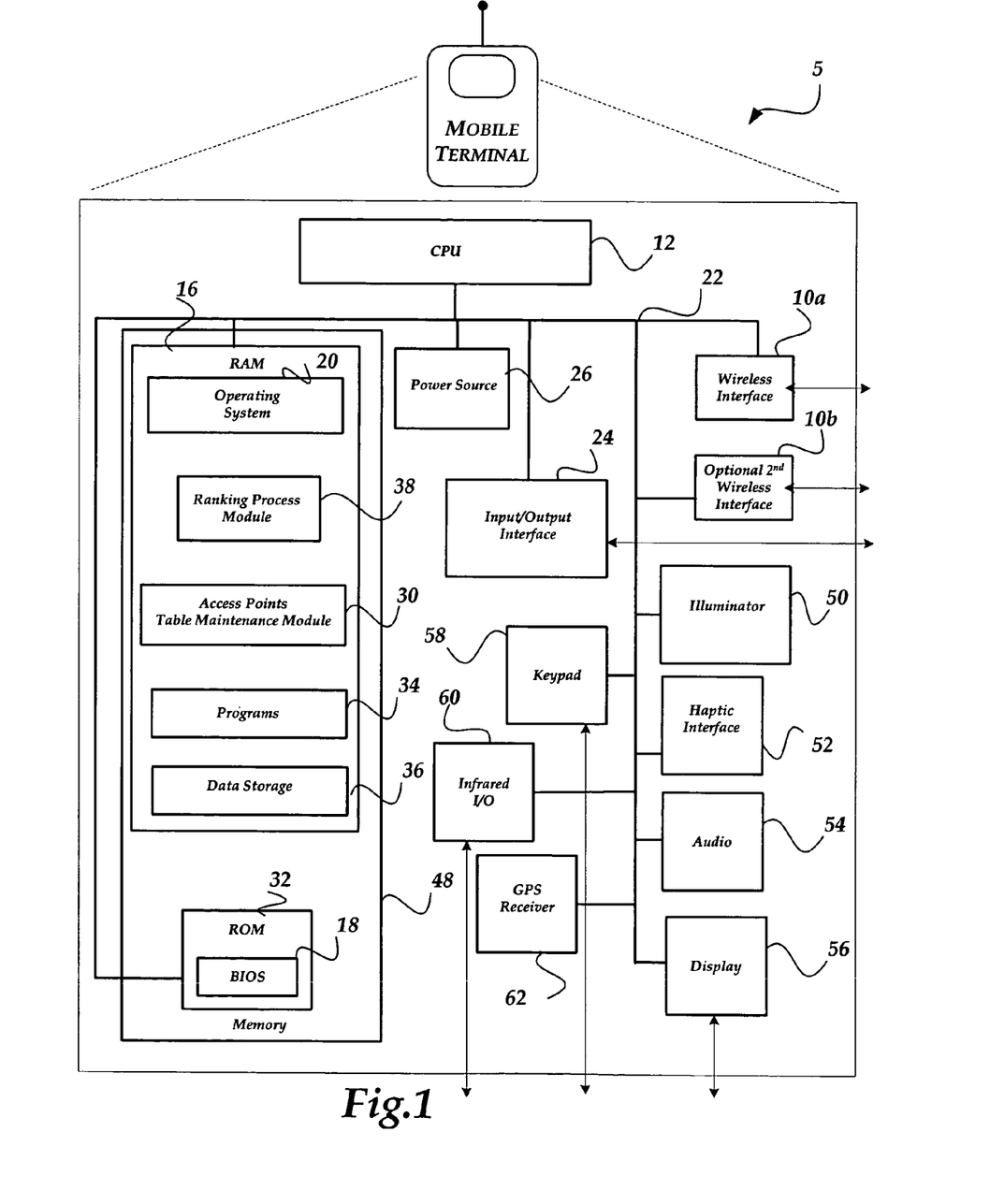
FIG. 1 is a schematic diagram that illustrates components that can be included in a mobile terminal.

An exemplary embodiment is described in terms of a mobile terminal that communicates with one or more wireless access points, which are included in a network of wireless access points that communicate with a network monitoring device. FIG. 1 shows an exemplary mobile terminal 5, according to one embodiment of the invention. In one embodiment, mobile terminal 5 is a cellular telephone that is arranged to send and receive voice communications and messages such as Short Messaging Service (SMS) messages via one or more wireless communication interfaces. Generally, mobile terminal 5 can comprise any device capable of communicating with one or more wireless network via one or more wireless access points. Such devices include cellular telephones, smart phones, pagers, radio frequency (RF) devices, infrared (IR) devices, integrated devices combining one or more of the preceding devices, and the like. Mobile terminal 5 can also comprise other wireless interface devices such as Personal Digital Assistants (PDAs), handheld computers, personal computers, multiprocessor systems, microprocessor-based or programmable consumer electronics, network PCs, wearable computers, and the like.

Figure 2:
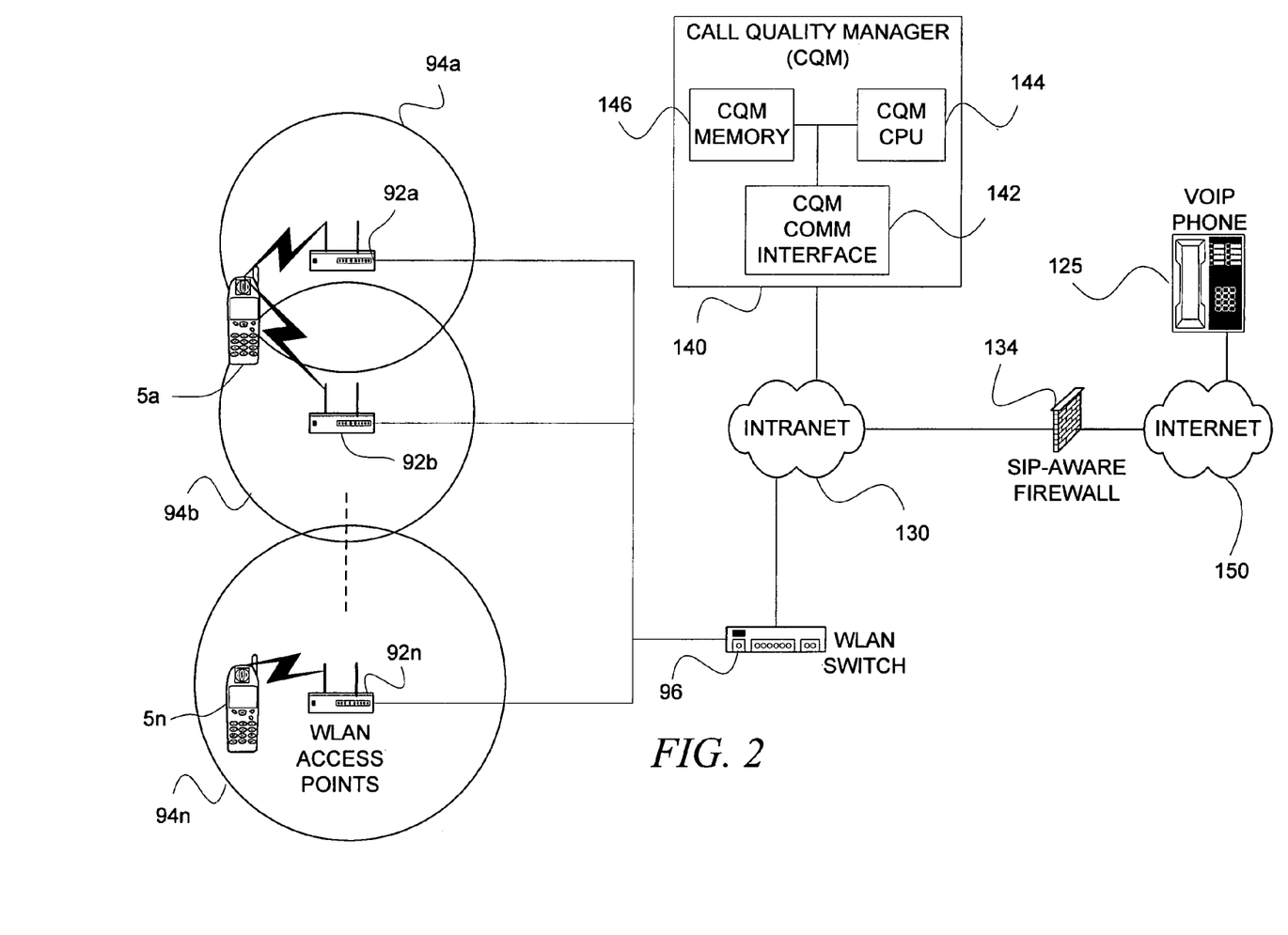
FIG. 2 is a functional block diagram illustrating an enterprise configuration of functional elements for an exemplary embodiment of the invention.

Mobile terminal 5 can include many more components than those shown in FIG. 2. However, the components shown are sufficient to disclose an illustrative embodiment for practicing the present invention. As shown in the figure, mobile terminal 5 includes a processing unit 12, a memory 48, a RAM 16, a ROM 32, an operating system 20, an access points table maintenance module 30, programs 34, a data storage 36, a ranking process module 38, a bios 18, a power source 26, an input/output interface 24, a wireless interface 10a, an optional second wireless interface 10b, an illuminator 50, a haptic interface 52, an audio interface 54, a display 56, a keypad 58, an infrared input/output interface 60, and a global positioning systems (GPS) receiver 62.

Mobile terminal 5 can optionally communicate with a wireless access point or other base station (not shown), or directly with another mobile device, via wireless interfaces 10a and/or 10b. Wireless interfaces 10a and 10b include circuitry for coupling mobile terminal 5 to various wireless networks, and are constructed for use with various communication protocols including, but not limited to, global system for mobile communications (GSM), code division multiple access (CDMA), Institute for Electrical and Electronics Engineers (IEEE) 802.11, IEEE 802.16 (WiMax), user datagram protocol (UDP), transmission control protocol/Internet protocol (TCP/IP), SMS, general packet radio service (GPRS), Wireless Application Protocol (WAP), and the like.

Mass memory 48 generally includes RAM 16, ROM 32, and one or more data storage units 36. Mass memory 48 as described above illustrates a type of computer-readable media, namely computer storage media. Computer storage media may include volatile and nonvolatile, removable and non-removable media implemented in any method or technology for storage of information such as computer readable instructions, data structures, program modules or other data. Examples of computer storage media include RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device. Data storage 36 can be utilized by mobile terminal 5 to store, among other things, programs 34, access points table maintenance module 30, ranking process module 38, databases and/or libraries of images, lists and other data.

The mass memory stores operating system 20 for controlling the operation of mobile terminal 5. It will be appreciated that this component may include a general purpose operating system such as a version of UNIX or LINUX™, or a specialized mobile communication operating system such as the Symbian® operating system. Basic input/output system ("BIOS") 18 is also provided for controlling the low-level operation of mobile terminal 5. The mass memory further stores application code and data used by mobile terminal 5. More specifically, mass memory 48 stores access points table maintenance module 30, programs 34, and ranking process module 38. The modules can include computer executable instructions, which can be run under control of operating system 20 to prioritize and otherwise control communication with wireless access points, base stations, and/or other mobile terminals. Also, programs 34 can include computer executable instructions which, when executed by mobile terminal 5, transmit and receive WWW pages, e-mail, audio, video, and enable telecommunication with another user of another mobile device.

Mobile terminal 5 also comprises input/output interface 24 for communicating with external devices, such as a headset, or other input or output devices not shown in FIG. 2. Keypad 58 can comprise any input device arranged to receive input from a user. For example, keypad 58 can include a push button numeric dial, or a keyboard. Keypad 58 can also include command buttons that are associated with selecting and sending images. Display 56 can be a liquid crystal display (LCD), gas plasma, light emitting diode (LED), or any other type of display used with a mobile device. Display 56 can also include a touch sensitive screen arranged to receive input from an object such as a stylus or a digit from a human hand. Additionally, infrared input/output 60 can be used to send and receive infrared commands to/from other devices.

Power supply 26 provides power to mobile terminal 5. A rechargeable or non-rechargeable battery can be used to provide power. The power can also be provided by an external power source, such as an AC adapter or a powered docking cradle that supplements and/or recharges a battery.

As shown, mobile terminal 5 includes illuminator 50, haptic interface 52, and audio interface 54. Illuminator 50 can remain active for specific periods of time or in response to events. For example, when illuminator 50 is active, it can backlight the buttons on keypad 59 and stay on while the mobile device is powered. Also, illuminator 50 can backlight these buttons in various patterns when particular actions are performed, such as dialing another mobile device. Illuminator 50 can also cause light sources positioned within a transparent or translucent case of the mobile device to illuminate in response to actions. Haptic interface 52 is arranged to provide tactile feedback to a user of the mobile terminal. For example, the haptic interface can be employed to vibrate mobile terminal 5 in a particular way when another user of a mobile device is calling. Audio interface 54 is arranged to produce and receive audio signals such as the sound of a human voice. For example, audio interface 54 can be coupled to a speaker and microphone (not shown) to enable telecommunication with others and/or generate an audio acknowledgement for some action.

GPS receiver 62 can determine the physical coordinates of mobile terminal 5 on the surface of the Earth, which can be presented to a geographical address program in longitude and latitude coordinates. These coordinates can include latitude, longitude and altitude. GPS is operated by the United States Department of Defense to provide worldwide navigation, position location, and precision timing services. GPS comprises a global network of satellites that interact with GPS receiver 62, allowing the geographical address application to precisely determine the location of mobile terminal 5. This location is typically output from GPS receiver 62 as latitude and longitude values. GPS receiver 62 can also employ other geo-positioning mechanisms, including, but not limited to, triangulation, assisted GPS (AGPS), E-OTD, CI, SAI, ETA, BSS and the like, to further determine the physical location, velocity, acceleration, and/or other characteristics of mobile terminal 5 on the surface of the Earth. It is understood that under different conditions, GPS receiver 62 can determine a physical location within millimeters for mobile terminal 5; and in other cases, the determined physical location can be less precise, such as within a meter or significantly greater distances.

FIG. 2 is a functional block diagram illustrating an enterprise configuration of functional elements for an exemplary embodiment of the invention. Mobile terminals 5a and 5n are each in wireless communication with one or more wireless access points such as WLAN access points 92a, 92b, and/or 92n. Wireless communication can be achieved with a number of wireless communication technologies and/or protocols including IEEE 802.11, IEEE 802.16, Bluetooth™, Infrared, and the like. Each mobile terminal can detect one or more wireless access points, if within the coverage area of one or more access points. For example, mobile terminal 5a can detect wireless access points 92a and 92b, since mobile terminal 5a is within wireless coverage areas 94a and 94b, respectively. Thus, wireless access points 92a and 92b are referred to as detected wireless access points in relation to mobile terminal 5a. Neighboring wireless access points can provide a neighboring communication coverage area that is adjacent to or overlapping the coverage area of a detected wireless access point. However, a neighboring wireless access point is not yet detected by the mobile terminal. For example, wireless access point 92n is a neighboring wireless access point relative to mobile terminal 5a. Mobile terminal 5a has not yet detected neighboring wireless access point 92n, because mobile terminal 5a is not yet within a neighboring wireless access point coverage area 94n.

Both detected wireless access points and neighboring wireless access points are in communication with a call quality manager (CQM) 140. Communication with CQM 140 can be implemented in a variety of ways, including through a WLAN switch 96, an intranet 130, and the like. CQM 140 can comprise one or more network nodes, such as routers, servers, and the like. CQM 140 can include a number of components, including a CQM communication interface 142 for communicating with the wireless access points. CQM 140 can further include a CQM CPU 144 for executing machine instructions stored in a CQM memory 146. The machine instructions include instructions for obtaining and evaluating status data regarding the wireless access points, and/or overall network performance. CQM 140 can also providing other network monitoring and management functions.

The wireless access points can communicate status data from CQM 140 to the mobile terminals, and can receive status reports from the mobile terminals. The wireless access points also enable communication between the mobile terminals and other nodes, including wired communication devices. For example, mobile terminals 5a and/or 5n can communicate through a session initiation protocol (SIP) aware firewall 134, and through a public internet 150 to a voice over internet protocol (VOIP) telephone 125. Both voice communication and data communication are possible among the mobile terminals and between the mobile terminals and other nodes such as VOIP telephone 125 and other computing devices.

Figure 3:
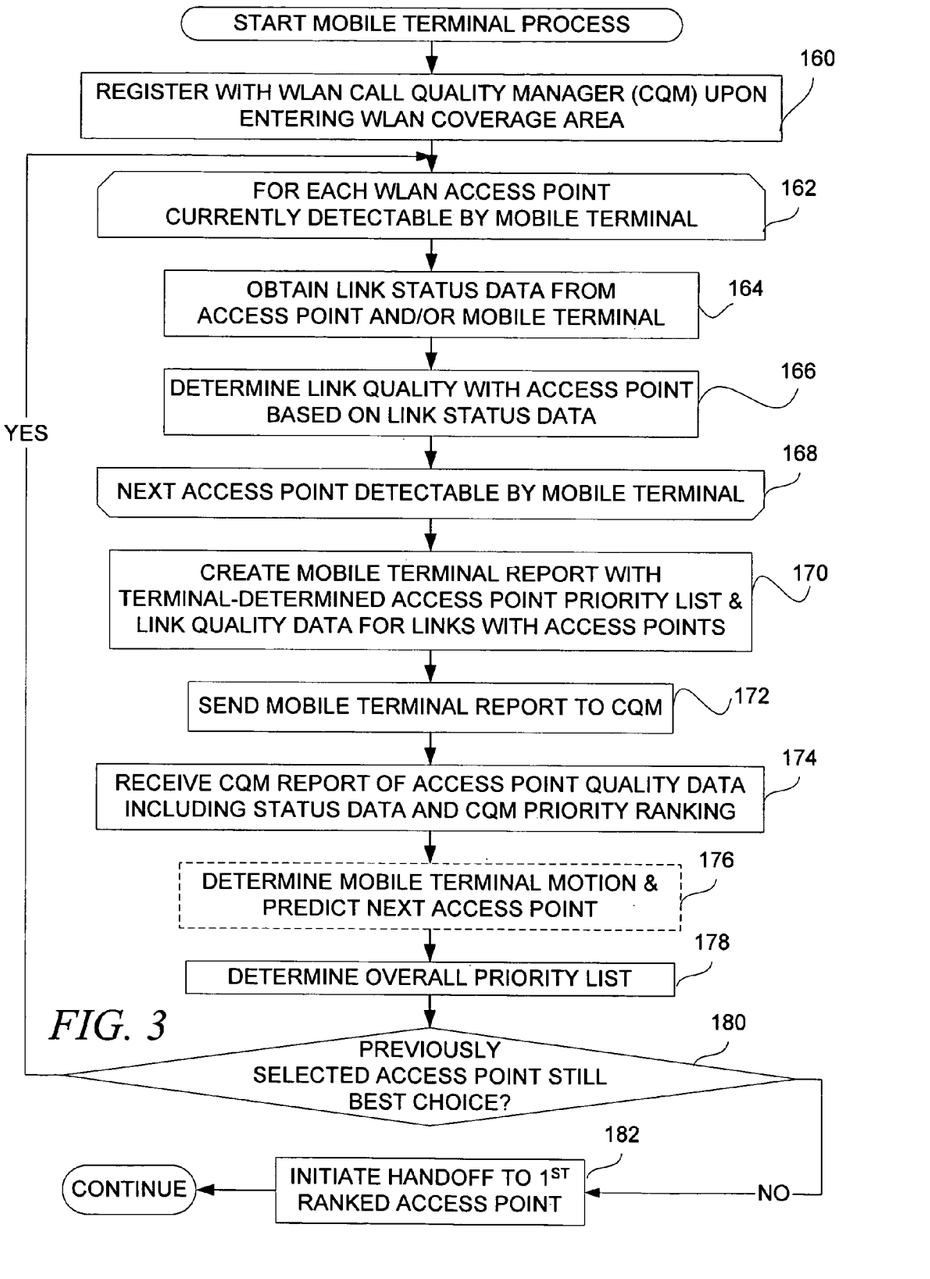
FIG. 3 is a flow diagram illustrating exemplary logic for controlling communication between a mobile terminal and one or more wireless access points.

FIG. 3 is a flow diagram illustrating exemplary logic for controlling communication between a mobile terminal and one or more wireless access points. At an operation 160, the mobile terminal registers with the CQM upon entering a coverage area of a wireless access point that is networked to the CQM. A loop operation 162 is performed regarding each wireless access point that is currently detected by the mobile terminal. At an operation 164, the mobile terminal obtains link status data from a detected access point and/or detects link status data with the mobile terminal's own communication interface. Link status data can include a received signal strength indication (RSSI), a data rate, a band width, a channel, a coder/decoder identifier, a round trip time, a jitter value, a packet loss value, packet information, voice information, and the like. Based on the link status data, the mobile terminal determines a link quality, at an operation 166, regarding the communication link with the detected wireless access point. The link quality can be a numerical value, a level indicator (e.g., red, yellow, green), or other measure. At a loop termination operation 168, the mobile terminal determines whether another wireless access point is currently detected by the mobile terminal, such that control should return to loop operation 162 to obtain link status data from the next currently detected wireless access point.

When link status data and link quality data have been obtained and determined for all wireless access points that are currently detected by the mobile terminal, the mobile terminal creates a mobile terminal report, at an operation 170. The mobile terminal report can include the link status data and the link quality data. The mobile terminal report can also include a terminal priority list that ranks communication links with the wireless access points. The terminal priority list is determined as a function of the link status data and/or the link quality data determined for each currently detected wireless access point. A sample mobile terminal report is provided in Table 1 below.

TABLE 1

Sample Mobile Terminal Report

| Access Point Identifier | RSSI | Quality | Data Rate | Channel | Priority |
|---|---|---|---|---|---|
| 00:E0:0B:F5:62:08 | −83 dB | 15/19 | 11 Mbps | 6 | 1 |
| 00:04:59:8A:09:3C | −90 dB | 13/19 | 5.5 Mbps | 11 | 2 |

At an operation 172, the mobile terminal communicates the mobile terminal report to the CQM. Mobile terminal reports can be sent to the CQM at varying rates, depending on available bandwidth, resolution of data, and/or other factors. For example, mobile terminal reports can be sent infrequently when the mobile terminal is not engaged in an active voice call. Conversely, mobile terminal reports can be sent more frequently when the mobile terminal is engaged in an active voice call. The CQM uses the terminal report to obtain additional status information and perform additional evaluation of the wireless access points. Further detail is described below with regard to FIG. 4.

At an operation 174, the mobile terminal receives a CQM report from the CQM via one of the currently detected wireless access points. The CQM report includes additional status data regarding the wireless access points and network performance, which may not be detectable or determinable by the mobile terminals. The CQM report can also include a CQM priority ranking (different from the terminal priority list). The CQM ranking of wireless access points can include one or more neighboring wireless access points that are not currently detectable by the mobile terminal. The mobile terminal can optionally determine a current position, velocity, acceleration, and/or other motion characteristics, at an optional operation 176. Based on the motion characteristics, the mobile terminal can predict which of the wireless access points listed in the CQM report is most likely to be closest to the mobile terminal and/or most likely to be shortly detected by the mobile terminal. The motion characteristics and predictions can be made over a period of time, comparing multiple terminal reports and/or CQM reports. At an operation 178, the mobile terminal determines an overall priority list of wireless access points to determine a best wireless access point for current or primary communication. Determining a best wireless access point takes into account not only a closest wireless access point, but also other status and characteristics of each wireless access point that may or may not be directly available to the mobile terminal. For example, current load data may not be directly available to the mobile terminal. Instead, the mobile terminal can obtain such data from the CQM report.

Once the mobile terminal has determined an overall priority list, the mobile terminal determines, at a decision operation 180, whether a previously selected wireless access point is still the best choice for primary communication. If the previously selected wireless access point is still ranked highest on the overall priority list, control returns to loop operation 162 to repeat the process of obtaining status data and evaluating quality of each of the wireless access points. However, if the previously selected wireless access point is no longer the highest ranked wireless access point, the mobile terminal initiates a communication handoff to the highest ranked wireless access point, at an operation 182.

Figure 4:
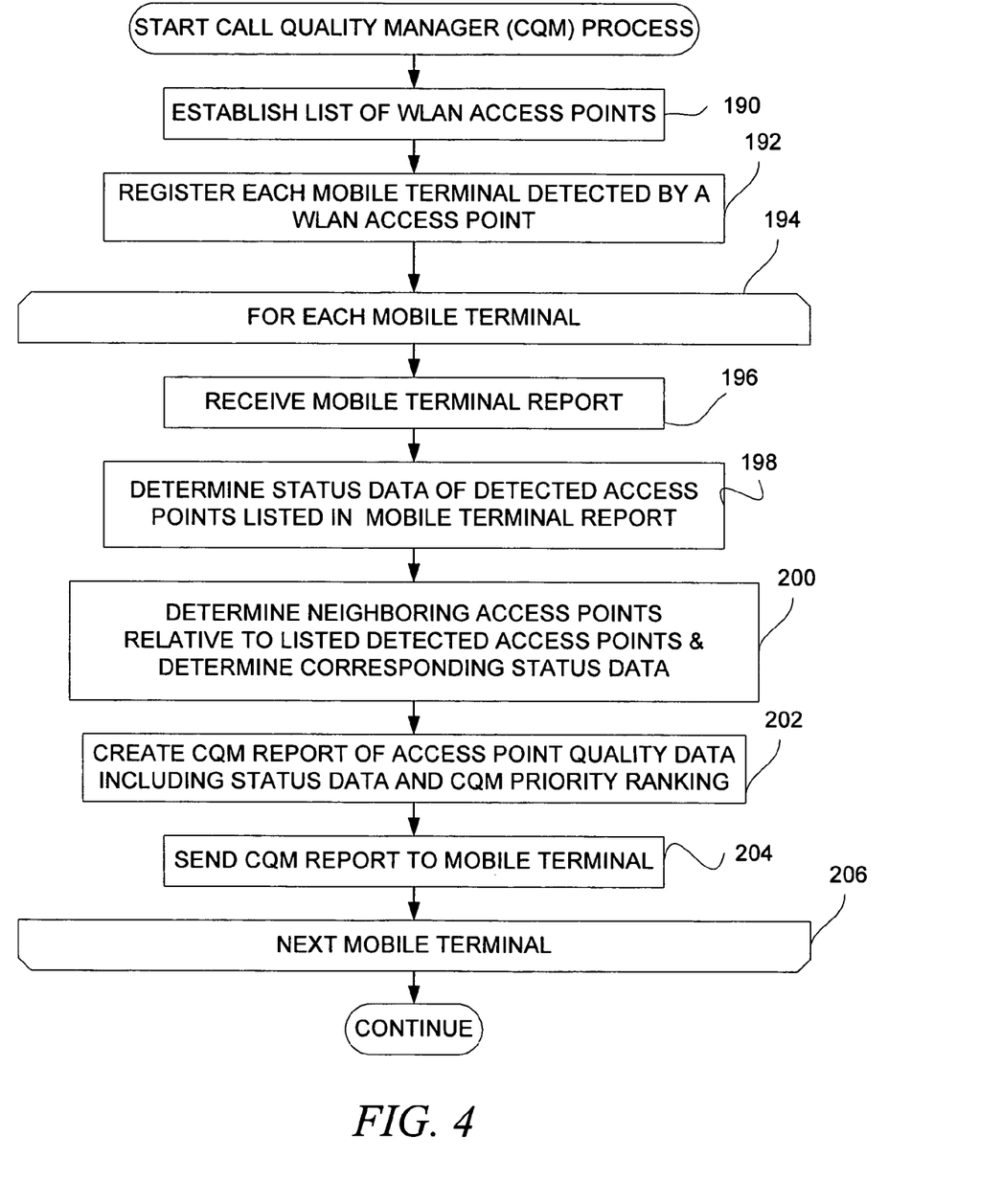
FIG. 4 is a flow diagram illustrating exemplary logic for the CQM to evaluate wireless access points associated with mobile terminals.

FIG. 4 is a flow diagram illustrating exemplary logic for the CQM to evaluate wireless access points associated with mobile terminals. At an operation 190, the CQM establishes a list of all wireless access points with which the CQM can communicate. The CQM registers each mobile terminal that is detected by a wireless access point, at an operation 192. At a loop operation 194, the CQM begins gathering and processing status and quality data related to each wireless access point that can be associated with a mobile terminal. At an operation 196, a wireless access point receives a mobile terminal report and relays the mobile terminal report to the CQM. It is contemplated that the mobile terminal report can be received by any of the wireless access points that detect the mobile terminal, and not just the wireless access point that the mobile terminal is currently using for primary communication. At an operation 198, the CQM reads the mobile terminal report to determine which wireless access points are currently detected by the mobile terminal.

The CQM then obtains status data regarding each of the wireless access points that are currently detected by the mobile terminal and listed in the mobile terminal report. Status data can include communication capacity, current load, security status and capabilities, voice packets lost, voice packets reordered, average latency, and the like. The status data can also include policy information, such as an admission policy indicating whether a wireless access point has capacity to permit a new call to be made, a roam policy indicating whether the wireless access point has capacity to support an existing call to roam, a lifeline policy indicating whether the wireless access point has capacity to support last resort cellular handoff efforts, and the like.

At an operation 200, the CQM determines neighboring access points relative to the wireless access points listed in the mobile terminal report as being detected by the mobile terminal. A neighboring wireless access point provides a neighboring communication coverage area that is adjacent to or overlapping a detected wireless access point communication coverage area, but the neighboring wireless access point is not yet detectable by the mobile terminal. The CQM then obtains status data regarding each of the neighboring wireless access points. Based on the status data of the detected wireless access points and the neighboring wireless access points, the CQM determines quality data and ranks the wireless access points. The CQM then creates a CQM report, at an operation 202. The CQM report can include the status data, the CQM priority ranking, and other relevant data. A sample CQM report is illustrated in Table 2.

TABLE 2

Sample CQM Report

| Access Point Identifier | Load | Priority | Policy |
|---|---|---|---|
| 00:E0:0B:F5:62:08 | 95% | 3 | Admission: N, Roam: N, Lifeline: N |
| 00:04:59:8A:09:3C | 55% | 1 | Admission: Y, Roam: Y, Lifeline: Y |
| 00:F6:81:45:02:7B | 35% | 2 | Admission: Y, Roam: Y, Lifeline: Y |

At an operation 204, the CQM sends the CQM report to the mobile terminal, which can use the CQM report to determine the overall priority list of wireless access points and select a best wireless access point. The CQM then determines, at a loop termination operation 206, whether another mobile terminal is detected by one of the wireless access points such that control should return to loop operation 194 to process another mobile terminal report and evaluate associated wireless access points.

The above specification, examples and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method, comprising:
   obtaining, by receiving a report from a mobile terminal, link quality data about at least one communication link between the mobile terminal and at least one wireless access point detected by the mobile terminal;
   obtaining access point quality data about the at least one wireless access point, the access point quality data being data that is not based on data detected by the mobile terminal;
   ranking, at a call quality manager node, the at least one wireless access point based on the access point quality data and the data in the report received from the mobile terminal, wherein the ranking is based on at least one indicator of link quality in addition to or other than signal strength; and
   causing a report comprising information on the ranking to be sent to the mobile terminal;
   wherein the call quality manager node is a distinct network entity from the wireless access points.

2. The method of claim 1, further comprising:
   initiating a handover of communication from a previously selected wireless access point to a selected wireless access point, wherein the mobile terminal used the previously selected wireless access point for primary communication.

3. The method of claim 1, wherein the link quality data comprises at least one of a data rate, a round trip time, a coder/decoder identifier, a jitter value, and a packet loss value.

4. The method of claim 1, wherein the access point quality data comprises at least one of a capacity, a load, a packet loss value, a packet reordering value, a latency, an admission capacity to permit a new communication, a roam capacity to support roaming of an existing communication, a lifeline handoff capacity to support rerouting communication to another network, and a recommended wireless access point.

5. A method, comprising:
   determining link quality data about at least one communication link between a mobile terminal and at least one wireless access point detected by the mobile terminal;
   causing a status report to be sent to a call quality manager node comprising link status data, the call quality manager node being a distinct network entity from the wireless access points; and
   receiving a report from the call quality manager node comprising information on a ranking of access points, the ranking being based at least in part on access point quality data, and the access point quality data being based on data that is not detected by the mobile terminal.

6. The method of claim 5 further comprising:
  determining a motion of the mobile terminal relative to the at least one detected wireless access point and a neighboring wireless access point; and
  determining a selected wireless access point as a function of the motion.

7. The method of claim 5, wherein the link quality data comprises at least one of a data rate, a round trip time, a coder/decoder identifier, a jitter value, and a packet loss value.

8. The apparatus of claim 7, wherein the apparatus is further caused to generate a mobile terminal report comprising at least one of the link quality data and a terminal priority list comprising a prioritized list of detected wireless access points, and cause communication of the mobile terminal report to a central computer that is in communication with the at least one detected wireless access point and with the neighboring wireless access point.

9. The apparatus of claim 7, wherein the apparatus is further caused to receive the access point quality data from a central computer that is in communication with the at least one detected wireless access point and with the neighboring wireless access point, determine an overall priority ranking of the detected wireless access points and the neighboring wireless access point, and determine whether a previously selected wireless access point maintains a first priority rank.

10. The apparatus of claim 7, wherein the apparatus is further caused to:
  obtain access point status data from the at least one detected wireless access point and from the neighboring wireless access point,
  determine a ranking of the at least one detected wireless access point and the neighboring wireless access point as a function of the access point status data, and
  produce a report of the access point quality data comprising the access point status data and rankings.

11. An apparatus comprising at least one processor and at least one memory including computer program code, the at least one memory and the computer program code configured to, with the at least one processor, cause the apparatus at least to:
  obtain, by receiving a report from a mobile terminal, link quality data about at least one communication link between the mobile terminal and at least one wireless access point detected by the mobile terminal,
  obtain access point quality data about the at least one detected wireless access point, the access point quality data being data that is not based on data detected by the mobile terminal,
  rank, at a call quality manager node, the at least one detected wireless access points based on the access point quality data and the data in the report received from the mobile terminal, wherein the processor is configured to perform the ranking based on at least one indicator of link quality in addition to or other than signal strength, and
  initiate sending of a report comprising information on the ranking to the mobile terminal;
  wherein the call quality manager node is a distinct network entity from the wireless access points.

12. The apparatus of claim 11, wherein the apparatus is further caused to initiate a handover of communication from a previously selected wireless access point to a selected wireless access point.

13. The apparatus of claim 11, wherein the link quality data comprises at least one of a data rate, a round trip time, a coder/decoder identifier, a jitter value, and a packet loss value.

14. The apparatus of claim 11, wherein the access point quality data comprises at least one of a capacity, a load, a packet loss value, a packet reordering value, a latency, an admission capacity to permit a new communication, a roam capacity to support roaming of an existing communication, a lifeline handoff capacity to support rerouting communication to another network, and a recommended wireless access point.

15. An apparatus comprising at least one processor and at least one memory including computer program code, the at least one memory and the computer program code configured to, with the at least one processor, cause the apparatus at least to:
  determine link quality data about at least one communication link between a mobile terminal and at least one wireless access point detected by the mobile terminal,
  initiate sending of a status report to a call quality manager node comprising link status data, the call quality manager node being a distinct network entity from the wireless access points, and
  receive a report from the call quality manager node comprising information on a ranking of access points, wherein the ranking is based on at least one indicator of link quality in addition to or other than signal strength and the ranking is based at least in part on access point quality data, the access point quality data being based on data that is not detected by the mobile terminal.

16. The apparatus of claim 15, wherein the apparatus is further caused to:
  include, in the access point quality data, at least one of a status and a quality assessment of a neighboring wireless access point, wherein the neighboring wireless access point provides a neighboring communication coverage area that is adjacent to or overlapping a detected wireless access point communication coverage area, wherein the neighboring wireless access point is not yet detectable by the mobile terminal; and
  select a wireless access point from the detected wireless access points and the neighboring wireless access point.

17. The apparatus of claim 16, wherein the apparatus is further caused to:
  determine link status data indicating a status of the at least one communication link between the mobile terminal and the at least one detected wireless access point; and
  determine a link quality for the at least one communication link with the at least one detected wireless access point.

18. The apparatus of claim 15, wherein the access point quality data comprises at least one of a capacity, a load, a packet loss value, a packet reordering value, a latency, an admission capacity to permit a new communication, a roam capacity to support roaming of an existing communication, a lifeline handoff capacity to support rerouting communication to another network, and a recommended wireless access point.

19. The apparatus of claim 15, wherein the link quality data comprises at least one of, a data rate, a round trip time, a coder/decoder identifier, a jitter value, and a packet loss value.

20. The apparatus of claim 15, wherein the apparatus is further caused to determine the access point quality data about each detected wireless access point.

21. The apparatus of claim 15, wherein the apparatus is further caused to determine a motion of the mobile terminal relative to the at least one detected wireless access point and a neighboring wireless access point.

22. A computer program product comprising a computer readable storage medium having a computer program stored thereon, said computer program configured to control a processor to perform a process, the process comprising:

obtaining, by receiving a report from a mobile terminal, link quality data about at least one communication link between the mobile terminal and at least one wireless access point detected by the mobile terminal;

obtaining access point quality data about the at least one detected wireless access point, the access point quality data being data that is not based on data detected by the mobile terminal;

ranking, at a call quality manager node, the at least one detected wireless access points based on the access point quality data and the data in the report received from the mobile terminal, wherein the ranking is based on at least one indicator of link quality in addition to or other than signal strength; and causing a report comprising information on the ranking to be sent to the mobile terminal;

wherein the call quality manager node is a distinct network entity from the wireless access points.

23. A method, comprising:

determining link quality data about at least one communication link between a mobile terminal and at least one wireless access point detected by the mobile terminal;

causing a status report to be sent to a call quality manager node comprising link status data, the call quality manager node being a distinct network entity from the wireless access points; and receiving from the call quality manager node a report comprising information on a ranking of access points, wherein the ranking is based on at least one indicator of link quality in addition to or other than signal strength and the ranking is based at least in part on access point quality data, the access point quality data being based on data that is not detected by the mobile terminal.

24. The method of claim 23, further comprising:

including, in the access point quality data, at least one of a status and a quality assessment of a neighboring wireless access point, wherein the neighboring wireless access point provides a neighboring communication coverage area that is adjacent to or overlapping a detected wireless access point communication coverage area, wherein the neighboring wireless access point is not yet detectable by the mobile terminal; and selecting a wireless access point from the detected wireless access points and the neighboring wireless access point.

25. The method of claim 24, wherein the link status data is determined by one of the mobile terminal and each detected wireless access point.

26. The method of claim 24, further comprising:

generating a mobile terminal report comprising at least one of the link quality data and a terminal priority list comprising a ranking of communication links with the detected wireless access points determined by the mobile terminal; and causing communication of the mobile terminal report to a central computer that is in communication with each detected wireless access point and with the neighboring wireless access point.

27. The method of claim 24, wherein the determining of the access point quality data comprises:

causing a central computer to obtain access point status data from each detected wireless access point and from the neighboring wireless access point;

causing the central computer to rank each detected wireless access point and the neighboring wireless access point as a function of the access point status data; and causing the central computer to communicate the access point status data and the ranking as the access point quality data to the mobile terminal.

28. The method of claim 24, wherein the selecting of a wireless access point comprises:

receiving the access point quality data from a central computer that is in communication with the detected wireless access points and with the neighboring wireless access point;

determining an overall priority ranking of the detected wireless access point and the neighboring wireless access points; and determining whether a previously selected wireless access point from the detected wireless access points, used for primary communication by the mobile terminal, maintains a first priority rank.

29. The method of claim 23, wherein the determining of the link quality data comprises:

determining link status data indicating a status of each communication link between the mobile terminal and each detected wireless access point; and determining a link quality for each communication link with each detected wireless access point.

30. The method of claim 23, wherein the link quality data comprises at least one of a data rate, a round trip time, a coder/decoder identifier, a jitter value, and a packet loss value.

31. The method of claim 23, wherein the access point quality data comprises at least one of a capacity, a load, a packet loss value, a packet reordering value, a latency, an admission capacity to permit a new communication, a roam capacity to support roaming of an existing communication, a lifeline handoff capacity to support rerouting communication to another network, and a recommended wireless access point.

32. The method of claim 23, further comprising:

determining access point quality data about each detected wireless access point.

33. The method of claim 23, further comprising determining a motion of the mobile terminal relative to the at least one detected wireless access point and a neighboring wireless access point.

34. A computer program product comprising a computer-readable storage medium having a computer program stored thereon, the program configured to control a processor to perform a process, the process comprising:

determining link quality data about at least one communication link between a mobile terminal and at least one wireless access point detected by the mobile terminal;

causing a status report to be sent to a call quality manager node comprising link status data, the call quality manager node being a distinct network entity from the wireless access points; and receiving a report comprising information on a ranking of access points from the call quality manager node, wherein the ranking is based on at least one indicator of link quality in addition to or other than signal strength and the ranking is based at least in part on access point quality data, the access point quality data being based on data that is not detected by the mobile terminal.

35. The computer program product of claim 34, the process further comprising:

determining access point quality data about each detected wireless access point.

36. The computer program product of claim 34, wherein the process further comprises determining a motion of the mobile terminal relative to the at least one detected wireless access point and a neighboring wireless access point.

* * * * *